Feb. 27, 1923.

M. W. MIX

AIRPLANE STRUT

Filed Apr. 19, 1920

Melville W. Mix, Inventor

By N. S. Amstutz

Attorney

Feb. 27, 1923.

M. W. MIX

AIRPLANE STRUT

Filed Apr. 19, 1920

Melville W. Mix Inventor

By N. S. Amstutz

Attorney

Patented Feb. 27, 1923.

1,446,761

UNITED STATES PATENT OFFICE.

MELVILLE W. MIX, OF MISHAWAKA, INDIANA.

AIRPLANE STRUT.

Application filed April 19, 1920. Serial No. 374,994.

*To all whom it may concern:*

Be it known that I, MELVILLE W. MIX, a citizen of the United States, residing at Mishawaka, in the county of St. Joseph and State of Indiana, have invented certain new and useful Improvements in Airplane Struts, of which the following is a specification.

My invention relates to improvements in airplane struts and it more especially appertains to the features hereinafter pointed out in the claims.

The purpose of my invention is to provide an airplane strut that is very light in weight and yet exceedingly strong; that provides a laminated body of streamline cross section; that provides a lengthwise holding strip for the flush attachment of the two edges of the ply-wood body which in cross section completes the stream-line contour of the body; that provides a separate longitudinal reinforcement throughout the length of the strut; that provides transverse reinforcements at different points of the strut, and that provides end attachments of streamline shape with an off-set flange adapted to pass inside of the strut ends and yet leave no projecting edges on the outside so that the rim of the attachment and the outer surface of the body are flush with each other.

The subject matter herein described is a continuation in part of a companion application Ser. No. 196,918 filed Oct. 16, 1917.

With these and other ends in view I illustrate in the accompanying drawing such instances of adaptation as will disclose the broad underlying features without limiting myself to the specific details shown.

Figure 1:
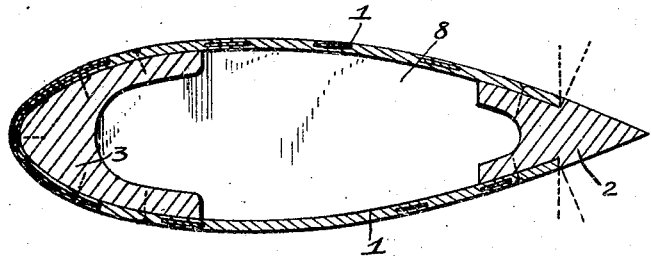
Fig. 1 is a plan in cross section of a strut with an inner reinforcement.
Figure 3:
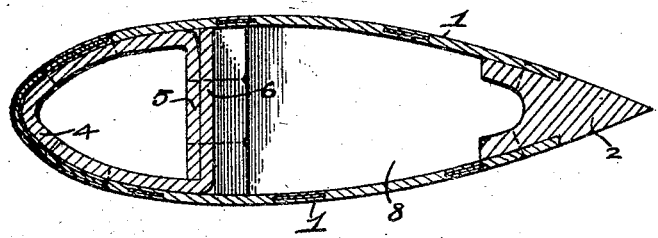
Fig. 3 is a similar view to Figs. 1 and 2 showing a formed inner reinforcement.
Figure 2:
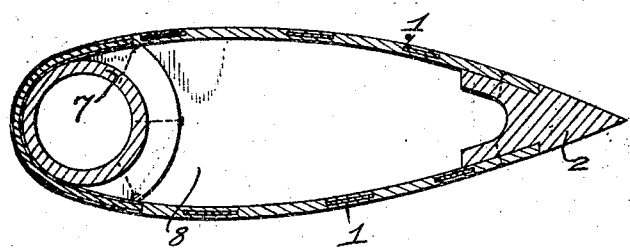
Fig. 2 is also a plan in cross section showing a tubular inner reinforcement.
Figure 4:
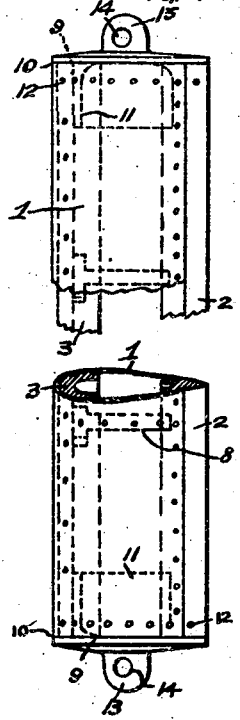
Fig. 4 is a side elevation of a completed airplane strut.
Figure 5:
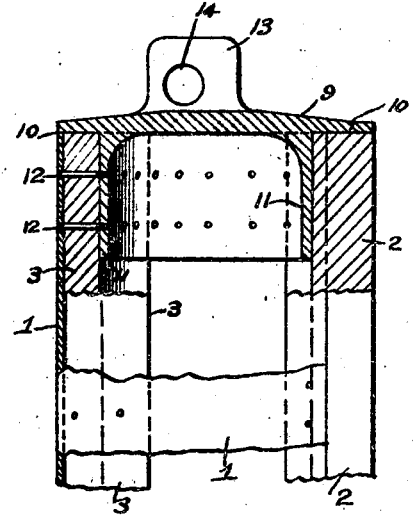
Fig. 5 is an enlarged side elevation in section of an end attachment, on a "forward aft" plane.
Figure 6:
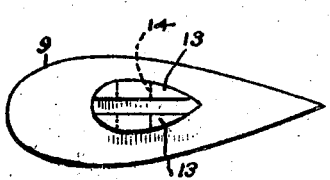
Figure 6 is a plan top view of Fig. 5.
Figure 7:
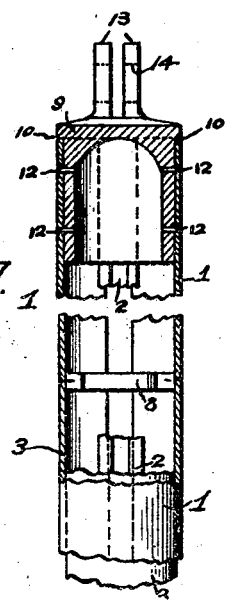
Fig. 7 is a sectional view of an end attachment transverse of Fig. 5.
Figure 8:
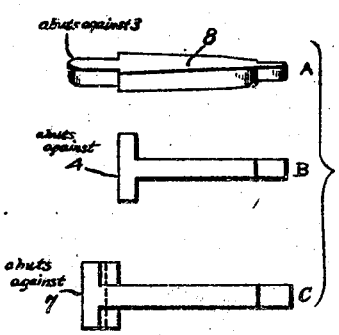
Fig. 8 is a detached perspective of a transverse reinforcement.

In carrying out my invention I may use any desired combination of ply-wood layers, or any combination of inner or outer metal or other sheaths but no claim on these specific features is made in this application. However the use of any and all kinds of expedients for accomplishing the purposes of this invention will constitute an embodiment of the broad spirit of this disclosure.

A laminated ply-wood body 1 is formed with a stream-line cross section. The two free edges closely approach each other where they are held in rabbets of the lengthwise supporting strip 2. This strip in its external contour completes the stream-line shape of the body, besides, forming no exterior projection of any kind whatever. The rabbets are just as deep as the body is thick so that the external surface of the body and the strip 2 are flush with respect to each other.

An important feature of my invention lies in the placing of a continuous lengthwise reinforcement inside of the larger edge of the strut, as for instance, the U shaped member 3, the bent-up member 4 and the tubular member 7. These reinforcements extend from end to end of the strut and they may be glued to the body similarly to the strip 2 and additionally attached by screws, brads, or otherwise. The member 3 is hollowed out to reduce weight and the member 4 may be formed of a ply-wood sheet bent-up unto a short flange 5 and a long one 6 whose edges engage adjacent surfaces of the member and the body respectively so as to provide rigidity in a transverse direction.

The reinforcements 3, 4, 7 or their equivalents may be made as separate units and the body with strip 2 also formed as a separate unit. This admits of assembling different kinds of reinforcements, the varying exigencies of practice may require, within the strut body 1. This possibility makes this invention of great practical value as the parts can be carried in stock, ready to be assembled in whatever relation one may desire. This facility and convenience as well as economy cannot be carried out by the developments in the prior art.

At different points of the length of a strut transverse reinforcements 8 may be used, as is deemed desirable. These may be glued or nailed as is found most expedient. To simplify their assembly they may be first attached to the reinforcements 3, 4 or 7 before the same are placed in the body. In thickness the parts 8 may be made to suit the kind of service in which the strut is to be employed.

Another important feature is found in the end attachments 9 not presenting any projecting edges. These parts are provided with a shoulder 10 which is as deep as the body 1 is thick, and internal flanges 11 that pass into the inside of the strut without interfering with the reinforcements 3, 4, 7 or the strip 2. Screws 12 may be used to attach the parts 9 to the body 1 as shown, or any other type of fastening may be used as desired.

The attachments 9 may have any desired arrangement of ears 13 provided with holes for securing guy wires, or holding spar plates, etc. The description has been more especially directed to airplane struts, I do not limit myself to this specific adaptation.

It will be apparent from the foregoing description that the invention meets a practical need; that it is consistent throughout to stream line characteristics; that it lends itself to great economy in manufacture; the utmost simplicity in assembling; and finally that it is a very efficient strut member for airplane or other structures, wherever great strength with reduction of weight is required.

What I claim is,

1. A composite structural member, comprising a composite unit of stream-line cross-section forming an enclosing shell, a longitudinal reinforcement to which the edges of the shell are secured the external surfaces of which conform to the stream-line contours of the shell, said reinforcement having an internal groove lengthwise thereof, separate lengthwise internal reinforcing means of selected cross section secured to the shell independently of the first reinforcement and transverse spreader plates whose outlines conform to the interior contours of the shell and the reinforcements.

2. A composite structural member, comprising a stream-line formed body portion consisting of a plurality of laminae constituting a single piece unit, separate longitudinal reinforcing means adapted to supplement the strength of the former, metallic end portions having internal flanges extending from abutting shoulders that are approximately flush with the exterior of the said units, and means for securing the same to the latter.

3. A composite structural member, comprising a laminated body of stream-line cross section, a plurality of longitudinal means to which the body is separately attached, and fastening terminals comprising internal and end abutting surfaces secured to the said member, said abutting surfaces being approximately flush with the exterior of the body.

4. An article of manufacture comprising a composite hollow stream-line structure and suitable end members having internal and external fastening and protecting flanges secured to the former to constitute a complete unit adapted for ready attachment wherever required, said external flanges terminating approximately flush with the exterior contour of the streamline structure.

5. A composite article of manufacture comprising a laminated stream-line body portion, separate and independently secured longitudinal reinforcements therefor, and end members fastened thereto so as to support the body portion interiorly and endwise thereof said members having abutting shoulders or flanges that are approximately flush with the outside surface of the body.

6. A composite structural unit, comprising a laminated stream-line body portion, a plurality of longitudinal reinforcing means extending substantially throughout its length, and secured to the body independently of each other, spreader plates within the body portion between its ends to supplement the reinforcements, and attaching members secured to the ends of the unit on the interior thereof.

7. In structural units, a single composite shell, longitudinal reinforcing means to which the edges of the sides of the shell are attached, the same constituting a unit, separate laminar lengthwise reinforcing means constituting a separate unit, and means for securing the same within the shell independently of the other reinforcement.

8. In structural units, a single composite shell, a longitudinal reinforcement to which the edges of the shell are attached, other longitudinal reinforcing means independently secured to the inside of the shell, and metallic end terminals extending inside of the shell and having a shoulder to protect the extreme end edges of the shell, said shoulder terminating approximately flush with the exterior of the shell.

9. An end member for airplane struts, comprising a body portion adapted to cover the open end of a stream line strut, said body having an exterior border approximately coincident with the exterior of the strut to which it is attached, a projecting flange of smaller dimension also of stream line contour adapted to pass into the interior of the strut, and fastening means formed on the outer end of the member.

10. An internal reinforcing unit for stream-line airplane struts comprising a formed cross section whose exterior follows the curve of the interior of the strut and whose interior is of different form from its exterior, said reinforcement extending the full length of the strut, and metallic end members having extending flanges whose exterior conforms approximately to the combined shape of the interior surfaces of the strut and its longitudinal reinforcements.

11. In transverse reinforcements for composite airplane struts, a member whose outline conforms to the interior of the struts, and projections to said reinforcements, perpendicular to the plane thereof.

12. In airplane struts, a stream-line laminar body portion, metallic end members therefor of stream line shape having an abutting shoulder thereon the width of said shoulder being approximately the same as the thickness of the body of the strut.

In testimony whereof I affix my signature.

MELVILLE W. MIX.